Figure 1:
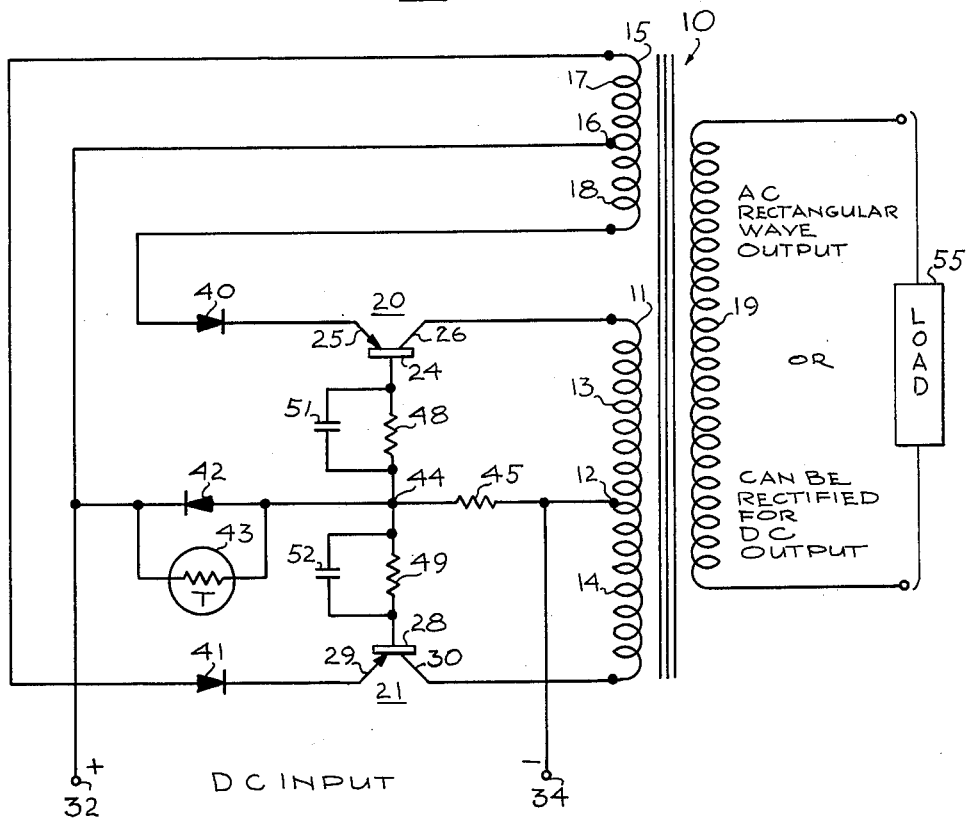

April 10, 1962 B. J. McCOMB 3,029,398
CONVERTER
Filed Aug. 5, 1959

BERTON JAMES McCOMB
INVENTOR.

BY
ATTORNEYS 3,029,398
CONVERTER
Berton J. McComb, Torrance, Calif., assignor to Thompson Ramo Wooldridge Inc., Los Angeles, Calif., a corporation of Ohio
Filed Aug. 5, 1959, Ser. No. 831,773
4 Claims. (Cl. 331—113)

This invention relates to a converter and more particularly to a converter network utilizing a transistor oscillator operable under high ambient temperatures.

Many converters are required to operate at variable ambient temperatures including high temperatures. However, the use of a vibrator converter, or any converter having moving parts, because of the frictional wear and attending damage, results in undesirable maintenance expenses and inconvenience. On the other hand, use of transistorized converters has been limited to systems wherein the temperature of operation may be maintained below the point at which transistors tend to provide high leakage currents which result in "thermal runaway" whereby the transistors overheat and destroy themselves. The problem is particularly acute at high ambient temperatures such as may be encountered in airborne or certain military applications. Another problem in this type of device wherein fault detection disables the converter to protect the components is the provision of an automatic recovery once the fault producing circumstance has been removed.

Therefore, an object of the present invention is to provide a transistorized converter containing reverse biasing means preventing excessive transistor collector current with possibility of thermal runaway during load shorting and particularly during high temperature operation.

Briefly, in accordance with one form of the present invention, a transistorized self-excited high frequency rectangular wave relaxation oscillator network having its feedback path completed through mutual couplings of windings of a saturable transformer is provided with a temperature sensitive arrangement to control the bias of the transistor elements in accordance with their tendency to conduct leakage currents. This oscillator, operated as a converter, produces a rectangular wave output which may be connected to a variable impedance load. The leakage current compensating arrangement includes a constant voltage dropping device in circuit with the emitter elements of each of the transistors and an inverse temperature impedance element connected in parallel circuit arrangement across the constant voltage impedance device, the emitter electrode, and the base electrode of each of the transistors.

The converter of the present invention is also provided with a simple and reliable self-starting arrangement whereby the converter will oscillate at any time a predetermined minimum voltage is applied thereto and a predetermined minimum impedance load is supplied thereby. When the load is shorted or heavily overloaded, the oscillations will cease.

Further objects and advantages of the present invention will become apparent and the invention will be better understood from the following description taken in connection with the accompanying drawing. The features of novelty which characterize this invention will be pointed out with particularity in the claims annexed to and forming part of this specification.

Figure 2:
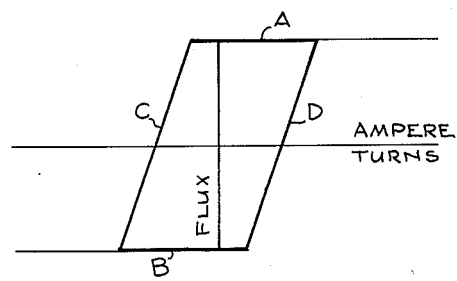

In the drawing,

FIG. 1 is a schematic circuit diagram showing one embodiment of the present invention; and FIG. 2 illustrates the flux excursion characteristics of the saturable transformer shown in FIG. 1.

In FIG. 1 there is shown a saturable transformer 10 having a primary winding 11 provided with a center tap 12 defining on each side thereof equal primary portions 13 and 14, each having N turns. On the same core of the transformer 10 there is mounted a tertiary winding 15 having a center tap 16 resulting in the provision of a pair of identical tertiary winding portions 17 and 18, each having a number of turns sufficient to provide a relatively low switching voltage. The transformer 10 is also provided with a secondary or output winding 19. A pair of similar power transistors 20 and 21 are connected to the tertiary winding portions 17 and 18 to be alternately turned on by these switching voltages. The particular transistors illustrated are of the PNP junction type. However, NPN junction or other switching transistors may be used to take advantage of the present invention in this type of circuit.

The transistor 20 has a base electrode 24, an emitter electrode 25 and a collector electrode 26. The similar transistor 21 has a base electrode 28, an emitter electrode 29 and a collector electrode 30. The collector electrodes 26 and 30 are each connected to provide an energizing unidirectional current to opposite ends of the primary winding portions 13 and 14 respectively. The emitter electrode 25 and the base electrode 24 are connected to receive a biasing current from the tertiary winding portion 18, and the emitter electrode 29 and the base electrode 28 are connected across the tertiary winding portion 17 to be turned on or off in response to the voltage thereof. The sense of the switching voltage application to the transistors 20 and 21 is selected so that a changing flux in the transformer 10 will turn on one transistor and turn off the other.

A voltage source (not shown) is connectable through the terminals 32 and 34 to cause a voltage differential across the transistors tending to cause current flow therethrough. Thus, there are provided three parallel circuits including respectively: the tertiary winding portion 18, a constant voltage dropping device 40, the transistor 20 and the primary winding portion 13; the tertiary winding portion 17, a constant voltage dropping device 41, the transistor 21 and the primary winding portion 14; and a parallel circuit combination including a third constant voltage dropping device 42 and a temperature sensitive resistance device 43, a junction 44 connected to each of the base electrodes 24 and 28 and a resistor 45. The constant voltage dropping devices 40 and 41 are similar, and the particular ones illustrated are germanium or silicon diodes connected with their polarities in the direction of the current flow through the respective transistors 20 and 21, thereby producing a predetermined and relatively constant voltage drop on the order of a volt, or less, between the tertiary winding 15 and the emitter electrodes 25 and 29 respectively. The constant voltage dropping device 42 is a rectifier connected in a reverse current direction to block current flow directly from the input terminal 32 to the resistor 45. Usually a germanium rectifier is preferable in this portion of the circuit to limit during oscillations the maximum value of the voltage at the junction 44. The lower voltage drop on germanium allows the oscillator to start more easily with less D.C. bias on power transistors. The temperature sensitive resistance device 43 provides a negative temperature coefficient resistance of the type normally ascribed to a thermistor and will hereinafter be referred to as a thermistor.

The converter illustrated in FIG. 1 is in effect a rectangular wave oscillator, the frequency of which is determined by the volt-second product of the primary winding 11. The circuit operation is in some respects similar to a vibrator converter except that the power transistors 20 and 21 perform the switching operation comparable to that performed by vibrator contacts. A pair of matched resistors 48 and 49 limit the magnitude of driving or base current through the transistors 20 and 21 respectively, during the respective turned on period. A pair of matched (bypass) capacitors 51 and 52 provide large transient drive voltages for reducing the transient time from transistor full on to transistor full off or vice versa. The specific values of the resistors 48 and 49 and the capacitors 51 and 52 are selected to provide balanced operation of the transistors 20 and 21.

The combination of the resistor 45 and the rectifier 42 results in biasing of the transistors to provide self-starting even under full load conditions during low ambient temperatures. The bias provided by this circuit is substantially ineffective when the oscillations of the circuit have started. During normal oscillations, the rectifier 42 serves to prevent the voltage at the junction 44 from reaching a positive value great enough to cause conductance of the non-conducting transistor. Such conductance of both transistors might cause excessive load current therethrough.

It may be seen that the transistor starting bias current flow is from the terminal 32, through one of the tertiary winding portions, the transistor emitter electrode connected thereto, the transistor base electrode, one of the resistors 48 or 49 and the resistor 45 to the terminal 34. Although both transistors are biased only partially "on" by this staring bias current, oscillations will quickly build up from a noise voltage inherent in such a circuit system. In other words, since transistor characteristics and other circuit components cannot be exactly identical in two parallel paths of a circuit, one of the transistors 20 or 21 will tend to conduct more current than the other. When this current starts to flow, the voltage drop across the resistors 45, and 48 or 49 will cause a larger primary or load current flow in one portion of the primary winding 11. This starting arrangement substantially increases the reliability of the circuit by ensuring the self-starting under load. When one of the transistors is conductive, any "turn on" bias current flow through the diode 42 will be in the forward direction whereby its blocking impedance is effectively removed from the circuit. It should also be noted that the load current of a portion of the primary winding also flows through a portion of the tertiary winding 15. Since this current flow creates ampere turns effecting the flux excursions within the core of the transformer 10, the number of turns in the primary winding is adjusted, in this case, increased, to overcome the bucking effect of such current flow in the tertiary winding 15.

Referring now to FIG. 2 there is shown a rectangular hysteresis lop illustrating flux excursion characteristics of the saturable transformer 10. The flux excursion of the core of the transformer 10 will follow the perimeter A, C, B, D, illustrated in FIG. 2, and because of the minimum turnaround time the flux excursion will be between saturation limbs A and B along one of the flux excursion lines C or D. Although it is possible to drive such a transformer beyond saturation along either the positive saturation limb A or the negative saturation limb B, such operation occurs only during switching. Thus, during no load operation, the impedance characteristic of the primary winding will be substantially constant and equal to the slope of one of the saturation lines C or D. The impedance presented by such a device is dependent upon the effective cross-sectional area, and saturation flux density of the core and the number of turns of the primary winding. Such a rectangular hysteresis loop of a saturable transformer is now known in the art and the details thereof need not be explained herein.

Referring again to FIG. 1, and assuming that the network conditions predominantly favor the initiation of conduction in the transistor 20, the tertiary winding portion 18 is coupled magnetically to the primary winding portion 13 in a sense enhancing the conductivity of the transistor 20 during flux excursions caused by such current flow. Also the tertiary winding portion 17 is coupled magnetically to the primary winding portion 13 in a sense inhibiting current conduction through the transistor 21 at this time. Current wil continue to flow through the circuit of the transistor 20 until the transformer 10 becomes saturated. During its conductive periods the transistor 20 does not significantly affect the magnitude of current flow therethrough because of its low "on" impedance. The circuit parameters are chosen so that the magnitude of current flow therethrough is controlled primarily by the inductance of the primary winding portion 13 and any reflected secondary load impedance. Thus, the magnetizing current increases slightly as core approaches saturation. However, at full load the reflected load current is many times larger than the magnetizing current, and the input current is nearly constant until the core saturates. At the instant the core saturates, input current goes to a value limited by power transistor base current and gain. Regardless of load currents, the magnetizing current continually induces voltages in the tertiary winding portions 18 and 17 until the transformer 10 becomes saturated (limb A, FIG. 2), at which time the tertiary winding portions 18 and 17 will no longer bias the transistors 20 and 21. When the transformer core is saturated by magnetizing current flow in its primary winding 11, the driving or switching voltage produced in the tertiary winding will no longer bias the transistor 20 to turn it on and the increased impedance of this transistor 20 now causes a reduction of current flow therethrough.

This increased impedance of the transistor 20 reduces the current flow in the primary winding to reverse the flux excursion of the transformer 10 and further increasing the impedance of the transistor 20. During such reversal of flux excursion, the tertiary winding portion 17 provides a voltage to render the transistor 21 conductive. At this instant the supply voltage from the terminal 32 causes current flow through the circuit including the transistor 21 and the primary winding portion 14 to energize the primary winding 11 in an opposite sense and thus complete the reversal of the direction of the flux excursion. Because of the dominating inductive impedance of the magnetizing circuit portions including the transistors 20 and 21 this magnetizing current flow through the transistor 21 is again continually increasing until the transformer 10 is driven to saturation in the opposite limb B (FIG. 2), and the cycle is repeated. The flux excursion reversal is accomplished during a short time period on the order of a few microseconds whereby the output wave closely approximates a true rectangular wave.

According to one embodiment of the present invention the constant voltage impedance devices 40 and 41 are silicon diodes which cooperate with the thermistor 43 to form a reverse biasing network for the transistors 20 and 21. The voltage drop across the silicon diodes is on the order of .8 volt. When germanium diodes are used the voltage drop across one diode would be on the order of .2 volt. Because of this lower voltage drop it might be desirable to connect two or more germanium diodes serially if the circuit parameters were selected so that a .4 or .6 volt drop respectively were desired.

This biasing network is operative whenever the impedance of a load 55 across the secondary winding 19 of the transformer 10 is less than a predetermined magnitude. It is particularly desirable to have this reverse biasing network operative under load short circuit conditions. According to the present invention, in such a circuit, used as a power converter, the output secondary winding 19 can be shorted completely without damage to the converter circuit. One inherent characteristic of such a self-excited magnetically coupled oscillator is that it will stop oscillating when one of its windings, such as the output winding, is shorted completely to prevent normal flux excursions. Moreover, the circuit will resume oscillations when the short is removed.

However, during cessation of oscillations there is an inherent tendency for the transistors 20 and 21 to conduct high leakage currents and ultimately go into an operation known as "thermal runaway" wherein the transistors overheat and become destroyed. The probability of such operation is substantially increased at high ambient temperatures.

According to the present invention this tendency to produce high leakage currents and ultimately thermal runaway can be eliminated at normal ambient temperatures and can be eliminated with the converter operating at higher ambient temperatures. The provision of the silicon diodes 40 and 41 in series with the emitter electrodes 25 and 29 results in an increased voltage drop in circuit with the emitter electrodes with respect to the base electrode. In one particular application the silicon diodes 40 and 41 provide approximately a .8 volt drop to reverse bias the emitter electrode-base electrode circuit. During high temperature operation the thermistor 43 by-passes increasing current around the diode 42 circuit. As a result the circuit resistance between the emitter-base circuit is reduced and the reverse biasing is made effective. The transistors go from forward bias at low temperatures to reverse bias at high temperatures. Thus it may be seen that with increase of temperature the reverse biasing voltage increases because of the reduced impedance drop of the thermistor 43 and the occurrence of excessive D.C. bias current is eliminated.

It will be recognized by those familiar with this type circuit that a particular application will require different relative dependency of the circuit components. However, by way of example, the circuit may be utilized to provide a thousand cycle output with a voltage increase on the order of twenty to one. Thus, the secondary winding 19 contains approximately 20 times as many turns as the effective primary winding for 30-volt input. Assuming the applied voltage in 30 volts D.C. the tertiary winding voltage needed is about 5 volts and the tertiary winding 15 would require only one-sixth of the turns of the winding 11. For a typical 1000 cycles per second oscillator, the resistor 45 has about 2,000 ohms resistance and resistors 48 and 49 would be 100 ohm resistors or less, the thermistor 43 varies from 100 ohms at low temperature to 4 ohms at high temperature, the capacitors 51 and 52 are 0.1 microfarad and the transistors 20 and 21 are of the PNP germanium type. Thus at low temperatures a starting bias voltage of approximately 1.5 volts is created across the thermistor 43 and at high temperatures the starting voltage is only .04 volt. Since the diodes 40 and 41 provide a voltage drop of .8 volt the transistors 20 and 21 are positively biased when cold and backbiased when hot. In either case the circuit will be self-starting while in neither case will it go into thermal runaway. It should be recognized that the impedance characteristics of the thermistor 43 is matched carefully to that of the other circuit components including the diodes 40 and 41, the transistors 20 and 21, and the resistor 45. In order to provide a circuit wherein the temperature of the thermistor 43 is the same as that of the transistors 20 and 21, the thermistor 43 is mounted in contact with the transistors 20 and 21. The resulting circuit is a converter having a feedback voltage as a function of flux excursion with the feedback voltage being responsive to load voltage to the extent that a shorted load will stop oscillations.

While there are shown and described particular embodiments of the present invention, modifications may occur to those skilled in the art. It is intended by the appended claims to cover any such modifications as fall within the true spirit and scope of the present invention.

I claim:

1. A self-starting converter network comprising: a saturable transformer having a primary winding, an output winding, and a tertiary winding; a pair of transistors each having emitter, collector and base electrodes; said collector electrodes being connected to one terminal of a source of power each through different portions of said primary winding; said emitter electrodes being separately connected to parallel circuits, each including a different portion of said tertiary winding and another terminal of said source of power; a pair of constant voltage dropping devices with a different one connected in series in each of said parallel circuits; a base circuit connecting each of said base electrodes to said another terminal of said source of power; and inverse temperature control means in said base circuit for controlling base circuit voltage to a level limiting self-starting potentials during high temperature operation.

2. A self-starting converter network comprising: a saturable transformer having a primary winding, an output winding, and a tertiary winding; a pair of transistors each having emitter, collector and base electrodes; said collector electrodes being connected to one terminal of a source of power each through different portions of said primary winding; said emitter electrodes being separately connected to parallel circuits, each including a different portion of said tertiary winding and another terminal of said source of power; a pair of constant voltage dropping devices with a different one connected in series in each of said parallel circuits; a base circuit connecting each of said base electrodes to said another terminal of said source of power; and inverse temperature control means in said base circuit for controlling base circuit voltage to a level limiting self-starting potentials during high temperature operation; said constant voltage dropping devices including diodes.

3. A self-starting converter network comprising: a saturable transformer having a primary winding, an output winding, and a tertiary winding; a pair of transistors each having emitter, collector and base electrodes; said collector electrodes being connected to one terminal of a source of power each through different portions of said primary winding; said emitter electrodes being separately connected to parallel circuits, each including a different portion of said tertiary winding and another terminal of said source of power; a pair of constant voltage dropping devices with a different one connected in series in each of said parallel circuits; a base circuit connecting each of said base electrodes to said another terminal of said source of power; and inverse temperature control means in said base circuit for controlling base circuit voltage to a level limiting self-starting potentials during high temperature operation, said inverse temperature control means including a negative coefficient resistor.

4. A self-starting converter network comprising: a saturable transformer having a primary winding, an output winding, and a tertiary winding; a pair of transistors each having emitter, collector and base electrodes; said collector electrodes being connected to one terminal of a source of power each through different portions of said primary winding; said emitter electrodes being separately connected to parallel circuits, each including a different portion of said tertiary winding and another terminal of said source of power; a pair of constant voltage dropping devices with a different one connected in series in each of said parallel circuits; a base circuit connecting each of said base electrodes to said another terminal of said source of power; and inverse temperature control means in said base circuit for controlling base circuit voltage to a level limiting self-starting potentials during high temperature operation, said inverse temperature control means including a negative coefficient resistor and a shunt connected diode.

References Cited in the file of this patent

UNITED STATES PATENTS

| | | |
|---|---|---|
| 2,802,071 | Lin | Aug. 6, 1957 |
| 2,808,471 | Poucel et al. | Oct. 1, 1957 |
| 2,862,109 | Kruper | Nov. 25, 1958 |
| 2,905,906 | Kittl | Sept. 22, 1959 |

OTHER REFERENCES

"An Amplitude Stabilized Transistor Oscillator," by Kretzmer, Proc. of IRE, pages 391 to 401, February 1954.

UNITED STATES PATENT OFFICE
CERTIFICATE OF CORRECTION

Patent No. 3,029,398

April 10, 1962

Berton J. McComb

It is hereby certified that error appears in the above numbered patent requiring correction and that the said Letters Patent should read as corrected below.

Column 3, line 49, for "lop" read -- loop --; column 5, line 35, for "in" read -- is --; line 37, for "of", second occurrence, read -- in --.

Signed and sealed this 30th day of October 1962.

(SEAL)
Attest:

ERNEST W. SWIDER
Attesting Officer

DAVID L. LADD
Commissioner of Patents